(12) United States Patent
Duggal et al.

(10) Patent No.: US 9,342,215 B2
(45) Date of Patent: May 17, 2016

(54) AUTOMATIC ENVIRONMENT RESTORATION FOR A PARTICULAR ARTWORK

(71) Applicant: Adobe Systems Incorporated, San Jose, CA (US)

(72) Inventors: Ashish Duggal, New Delhi (IN); Anant Gilra, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 168 days.

(21) Appl. No.: 14/140,140

(22) Filed: Dec. 24, 2013

(65) Prior Publication Data
US 2015/0177921 A1 Jun. 25, 2015

(51) Int. Cl.
| | |
|---|---|
| G06F 3/00 | (2006.01) |
| G06F 3/0481 | (2013.01) |
| G06F 9/44 | (2006.01) |
| G06F 3/0484 | (2013.01) |
| G06F 9/445 | (2006.01) |
| G06Q 10/10 | (2012.01) |

(52) U.S. Cl.
CPC ........ *G06F 3/04817* (2013.01); *G06F 3/04845* (2013.01); *G06F 9/4443* (2013.01); *G06F 9/44505* (2013.01); *G06Q 10/101* (2013.01)

(58) Field of Classification Search
CPC .... G06F 3/0481; G06F 3/0482; G06F 9/4443
USPC ................... 715/243, 255, 747, 810
See application file for complete search history.

(56) References Cited

U.S. PATENT DOCUMENTS

| | | | |
|---|---|---|---|
| 7,552,420 B1 | 6/2009 | Smith et al. | |
| 7,689,933 B1 * | 3/2010 | Parsons | 715/838 |
| 8,270,008 B2 * | 9/2012 | Kodimer et al. | 715/826 |
| 2002/0149623 A1 | 10/2002 | West et al. | |
| 2003/0079175 A1 | 4/2003 | Limantsev | |
| 2004/0153973 A1 | 8/2004 | Horwitz | |
| 2005/0075544 A1 | 4/2005 | Shapiro et al. | |
| 2006/0085749 A1 | 4/2006 | Daniel et al. | |
| 2006/0212301 A1 | 9/2006 | Olsen | |
| 2007/0113195 A1 | 5/2007 | Tormey et al. | |
| 2008/0104505 A1 * | 5/2008 | Keohane et al. | 715/781 |

OTHER PUBLICATIONS

Eric Z Goodnight, "How to Customize Photoshop.pdf", 9 pages, Jan. 23, 2012.*

(Continued)

*Primary Examiner* — Haoshian Shih
(74) *Attorney, Agent, or Firm* — Kilpatrick Townsend & Stockton LLP

(57) ABSTRACT

A method of saving and restoring an environment is disclosed. The method includes displaying, using an artwork editing application operating on a computing device, a representation of an artwork file. The method also includes receiving, using the computer device, input selecting an interface element for use in an interface of the editing application, displaying, using the computing device, the selected interface element of the application on the interface. Access to one or more editing features or editing functions is available through user interaction with the selected interface element on the interface of the artwork editing application. The method also includes saving data to a memory readable by the computing device, where the data includes a representation of the artwork file and an indication of the selected interface element of the application.

18 Claims, 10 Drawing Sheets

(56) References Cited

OTHER PUBLICATIONS

Jacob Gube, "Photoshop Patterns_ Ultimate Guide.pdf", 25 pages, Sep. 17, 2010.*
Adobe Photoshop CS2 User Guide, 2005, Adobe Systems Incorporated, 14 pages.
Non Final Office Action from related U.S. Appl. No. 11/691,45 dated Oct. 5, 2009, 16 pages.
Final Office Action from related U.S. Appl. No. 11/691,245 dated Apr. 27, 2010, 25 pages.
Non Final Office Action from related U.S. Appl. No. 11/691,245 dated Mar. 4, 2014, 25 pages.
Non Final Office Action from related U.S. Appl. No. 11/691,245 dated Apr. 8, 2015, 29 pages.
Final Office Action from related U.S. Appl. No. 11/691,245 dated Oct. 22, 2015, 60 pages.

* cited by examiner

AUTOMATIC ENVIRONMENT RESTORATION FOR A PARTICULAR ARTWORK

FIELD OF THE INVENTION

The present invention generally relates to saving and restoring environment variables for a particular artwork.

BACKGROUND OF THE INVENTION

While working on a particular file, such as an artwork, designers use a number of different settings in a software application to build and edit their work. These settings define the environment used for the particular artwork file. For example, designers working in Adobe Illustrator may use different brushes libraries and symbols libraries for different artwork files. In addition, designers working on a print job may use different swatches libraries or designers working on a multilingual artwork may use different glyph sets.

When opening an artwork, the data of the artwork is loaded and is made available to the designer, for example, for editing. However, certain settings are not stored, and are therefore not available to the designer upon opening the artwork file. As a result, to restore the environment previously used with the artwork, these settings must be recalled by the designer and manually applied to the application environment, using an interface to the application.

For example, a designer may want to work at home on an artwork created at their office. Downloading Operating System settings and preferences does not restore all of the software specific or artwork file-specific environment settings. For example, file-specific settings, such as relevant workspace, brushes library, and swatches have to be found among all downloaded settings and loaded manually. Recalling and finding the relevant settings from the entire set can be very time-consuming.

Sometimes a designer may work on multiple artworks for multiple clients. Every time the designer switches from one artwork to another, the designer has to manually reselect the environment settings for the new artwork. Accordingly, switching between projects is very inefficient.

To change an artwork previously worked on, a designer has to recall, for example, brushes libraries, color settings, composite font, etc.—the file-specific settings.

In some instances, a designer sends their work for review to one or more other team members or to a team lead. Teammates need to learn and manually set the brushes, libraries, and other settings to make changes. They might also unknowingly use unwanted symbols, which are present in another library not used for the artwork being reviewed. For example, after a junior designer finishes his work on a publication and sends the work to his team lead for review, the team lead needs to figure out which brushes library the junior designer used to make the design.

SUMMARY OF THE INVENTION

One inventive aspect is a method. The method includes displaying, using an artwork editing application operating on a computing device, a representation of an artwork file. The method also includes receiving, using the computer device, input selecting an interface element for use in an interface of the editing application, displaying, using the computing device, the selected interface element of the application on the interface. Access to one or more editing features or editing functions is available through user interaction with the selected interface element on the interface of the artwork editing application. The method also includes saving data to a memory readable by the computing device, where the data includes a representation of the artwork file and an indication of the selected interface element of the application.

Another inventive aspect is a computer system. The computer system includes a processor, a display, and a memory. The memory has instructions, which, when executed by the processor, cause the computer system to perform a method. The method includes displaying a representation of an artwork file on the display, displaying a selected interface element on the display, and saving data to the memory, where the data includes a representation of the artwork file and an indication of the selected interface element of the application.

Another inventive aspect is a computer-readable device including non-transient instructions, which, when executed, cause the computer to perform a method. The method includes displaying a representation of an artwork file on a display, displaying a selected interface element on a display, and saving data to a memory, where the data includes a representation of the artwork file and an indication of the selected interface element of the application.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
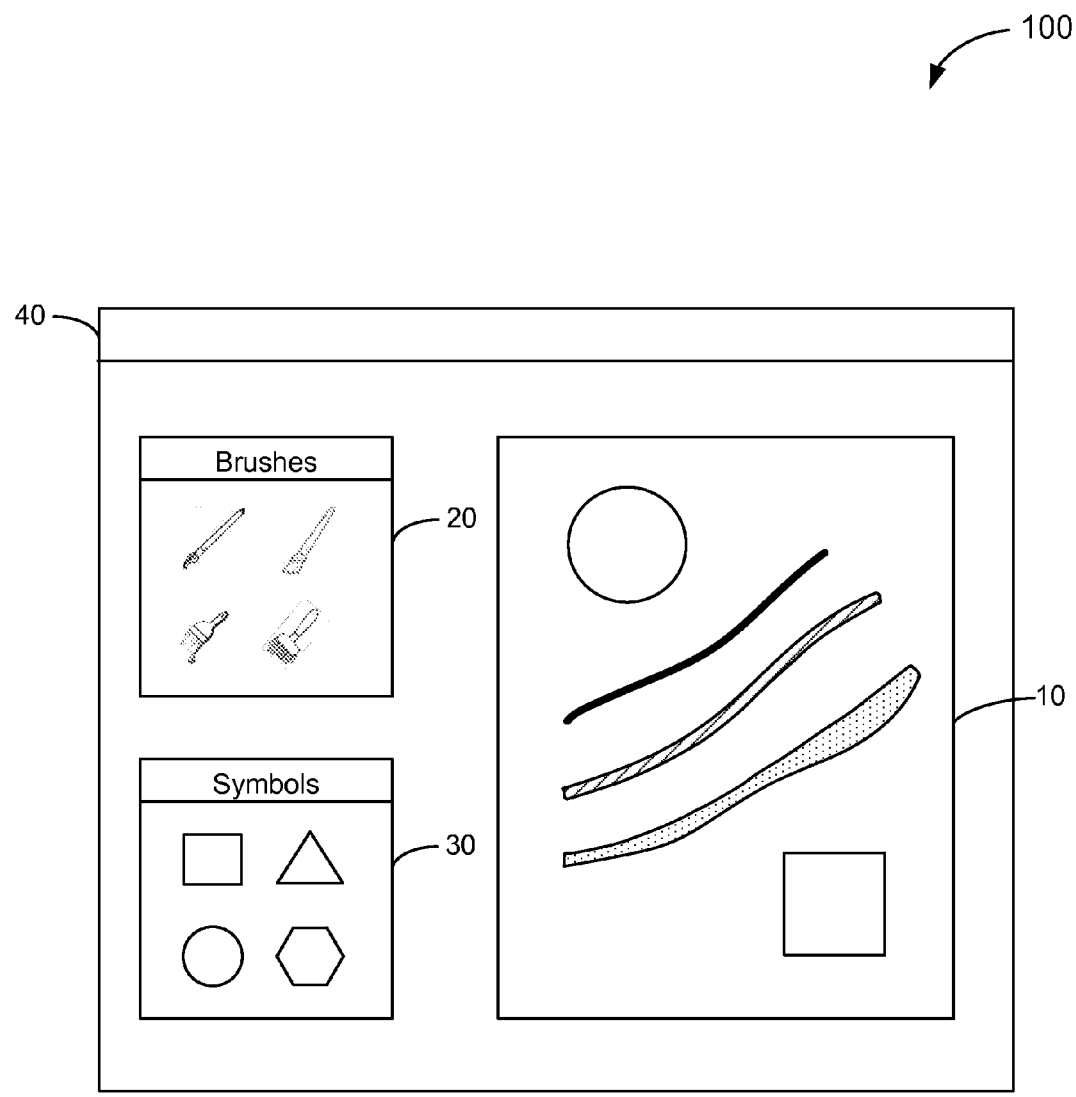
FIG. 1 is an illustration of a displayed output of an application operating on a computing device.

FIG. 1 is an illustration of a displayed output of an application operating on a computing device. The output includes a display window 100 displaying artwork 10, and interface elements 20 and 30. Interface elements 20 and 30 each include a plurality of selectable action control elements, wherein each action control element defines a quality of a modification to the artwork file in response to an input.

In this embodiment, interface element 20 includes brushes library 20, which includes a plurality of selectable brushes. Each of the brushes provides a different effect on the artwork when used.

In this embodiment, interface element 30 includes symbols library 30, which includes a plurality of selectable graphics which may be added to the artwork.

Display window 100 also includes menu banner 40, which shows a number of selectable menus (not shown), each indicating a number of action options when selected.

In this embodiment, a designer has generated artwork 10 using brushes library 20, which has been invoked through user interaction with the menu banner 40. In this example, the designer has selected certain brushes of brushes library 20, and has used them to generate portions of the artwork 10.

Artwork 10, may, for example, be a design including graphics, symbols, and text. Other graphical elements may additionally or alternatively be included.

In the embodiment of FIG. 1, the designer has generated artwork 10 using symbols library 30, which has been invoked through user interaction with the menu banner 40. In this example, the designer has selected certain symbols of symbols library 30, and has used them to generate portions of the artwork 10.

In other embodiments, one or more other interface elements may be additionally or alternatively displayed. For example, at least one of a graphic style element, a color setting element, a glyph set element, a workspace element, a preferences dialog settings element, a swatches library, an element related to PDF settings, an element related to SWF settings, an element related to print settings, an element related to font settings, an element related to a font menu, a Mojikumi element, a Kinsoku element, a composite font element, a menu set element, a keyboard shortcuts element, synchronizable preferences, a custom shapes element, a tool presets element, an actions element, a styles element, a patterns element, an ingredients element, and a contours element may be additionally or alternatively displayed.

During the design of artwork 10, interface elements 20 and 30, and artwork 10 have each been placed by the designer in locations as indicated in FIG. 1.

In some embodiments, the data representing artwork 10 is saved with information regarding the displayed interface elements 20 and 30. For example, in the embodiment of FIG. 1, if the designer decides to stop working on artwork 10 at the end of a day, the designer saves artwork 10. In addition to the data including a representation of artwork 10, the saved data may also include one or more attributes of the interface elements 20 and 30, which were used in the creation of artwork 10.

The one or more attributes of the interface elements may include, for example, an indication of the identity of the interface element, an indication of the type of the interface element, a display location of the interface element, and a setting of the interface element, for example, which of multiple interface element options was active when the data was saved. Other attributes of the interface elements may be additionally or alternatively included.

In some embodiments, the saved information regarding the displayed interface elements is associated with an identification of the designer. Accordingly, if multiple designers collaboratively work on the artwork 10, multiple sets of information regarding interface elements may be saved with the data representing artwork 10.

In some embodiments, the designer may save multiple sets of information regarding interface elements, giving each set a unique name, for example, identifying each set with a name indicative to the designer of the interface elements contained therein.

If a designer chooses to modify saved artwork 10, using the computing device, the designer accesses the data representing artwork 10. In addition, using the computing device, the computing device accesses the information regarding the displayed interface elements. As a result of accessing the information regarding the displayed interface elements, the computing device displays a representation of the artwork 10 and interface elements 20 and 30.

As a result, the designer is relieved of the need to restore the design environment to that which was previously used.

In some embodiments, the designer may select from one or more sets of information regarding used interface elements. For example, the designer may select from a list of sets, where each set is identified by designer identity, or by a name given to each of the sets.

In some embodiments, file-specific settings are not stored in the artwork file. In some embodiments, file-specific settings are or include application settings which are loaded as part of data for an application menu, for example, during creation of or editing of an artwork file. For example, a designer may be working with three workspaces—a Print workspace, a Mobile workspace, and a Web workspace. When working on an artwork for mobile phones he opens the artwork and then loads the Mobile workspace. When the artwork is saved, data indicating that the Mobile workspace was being used is also saved. Therefore, when reopened, both the artwork itself, and the Mobile workspace are opened in the application.

Figure 2:
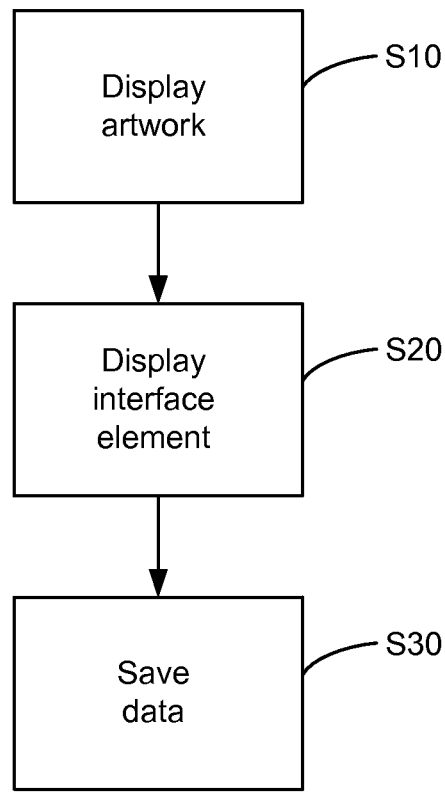
FIG. 2 is a flowchart diagram illustrating a method of using and saving data according to some embodiments.

FIG. 2 is a flowchart diagram illustrating a method of using and saving data according to some embodiments.

At step S 10, in response to an action from a user, such as a designer, an artwork, such as artwork 10 discussed above, is displayed by a computing device having a software application operating thereon. Through various interactions with the software via the computing device, the designer may modify the artwork.

At step S 20, in response to an action from the user, an interface element of the software application, such as one of the interface elements discussed above with reference to FIG. 1, is displayed. In some embodiments, multiple interface elements are displayed.

At step S 30, in response to an action from the user, data representing the artwork is saved to a memory of the computing device. In addition, in response to the same or another action from the user, data indicating the displayed interface element is also saved to the memory.

In some embodiments, the data representing the artwork and/or the data indicating the displayed interface element is saved to a memory which is remote from the computing device. For example, the data representing artwork and/or the data indicating the displayed interface element may be saved on a cloud computing network.

In some embodiments, the data representing the artwork and the data indicating the displayed interface element are each stored so as to be accessible, using a known address, such as a URL, with a software application configured to access the Internet.

Figure 3:
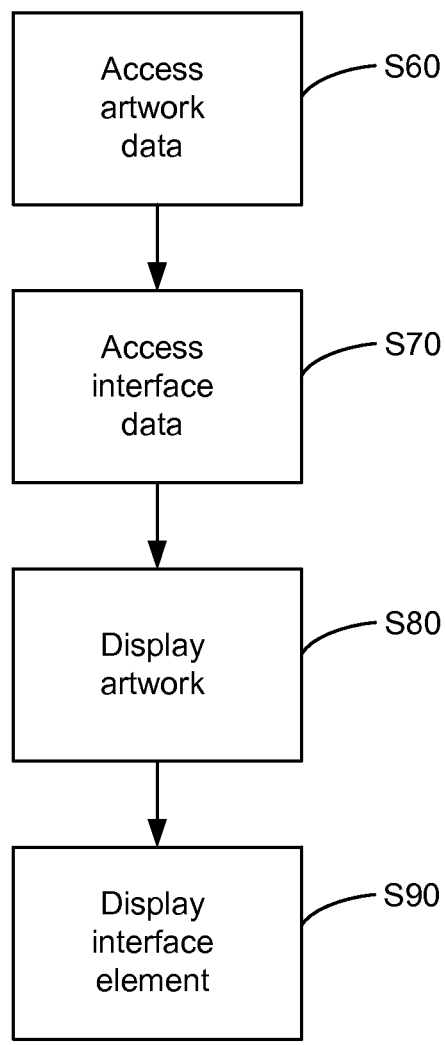
FIG. 3 is a flowchart diagram illustrating a method of accessing and using data according to some embodiments.

FIG. 3 is a flowchart diagram illustrating a method of accessing and using data, according to some embodiments.

At step S 60, in response to an action from a user, such as a designer, data representing artwork, such as artwork 10 discussed above, is accessed by a computing device having a software application operating thereon.

At step S 70, in response to the action of step S 60, or in response to another action, data indicating one or more interface elements of the software application, such as one of the interface elements discussed above with reference to FIG. 1, is accessed by the computing device.

At step S 80, in response to an action from the user, the artwork is displayed by the computing device. In some embodiments, the action, in response to which the artwork is displayed, is the same action in response to which the data representing the artwork is accessed.

At step S 90, in response to an action from the user, the interface element is displayed. In some embodiments, the action, in response to which the interface element is displayed, is the same action in response to which the data indicating the interface element of the software application is accessed. In some embodiments, multiple interface elements are displayed.

In some embodiments, the data representing the artwork and/or the data indicating the displayed interface element is located in a memory which is remote from the computing device. For example, the data representing artwork and/or the data indicating the displayed interface element may be located on a cloud computing network.

In some embodiments, the data representing the artwork and the data indicating the displayed interface element are each accessed using a known address, such as a URL, with a software application configured to access the Internet.

Figure 4:
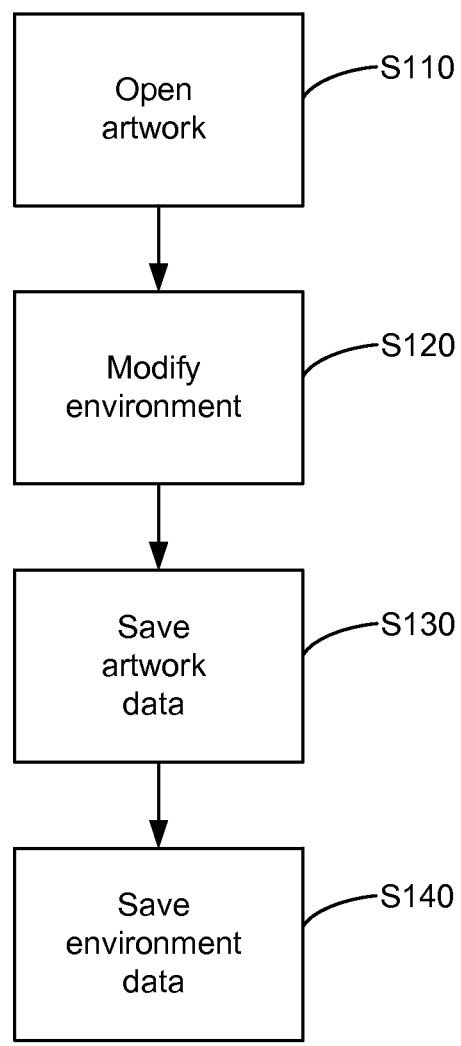
FIG. 4 is a flowchart diagram illustrating a method of using and saving data according to some embodiments.

FIG. 4 is a flowchart diagram illustrating a method of using and saving data according to some embodiments.

At step S 110, in response to an action from a user, such as a designer, an artwork, such as artwork 10 discussed above, is accessed and displayed by a computing device having a software application operating thereon. Through various interactions with the software via the computing device, the designer may modify the artwork.

At step S 120, in response to an action from the user, the design environment of the software application is modified by displaying an interface element of the software application, such as one of the interface elements discussed above with reference to FIG. 1. In some embodiments, multiple interface elements are displayed.

At step S 130, in response to an action from the user, data representing the artwork is saved to a memory of the computing device.

At step S 140, in response to the action of step S 130 or another action from the user, data indicating the displayed one or more interface elements is also saved to the memory. In some embodiments, the data indicating the displayed interface elements is stored with an identifier of the identity of the designer, such as a user ID. In some embodiments, the data indicating the displayed interface elements is stored with an identifier such that other sets of data indicating other interface elements may be stored and uniquely identified.

In some embodiments, the data representing the artwork and/or the data indicating the displayed one or more interface elements is saved to a memory which is remote from the computing device. For example, the data representing artwork and/or the data indicating the one or more displayed interface elements may be saved on a cloud computing network.

In some embodiments, the data representing the artwork and the data indicating the one or more displayed interface elements are each stored so as to be accessible using a known address, such as a URL, with a software application configured to access the Internet.

Figure 5:
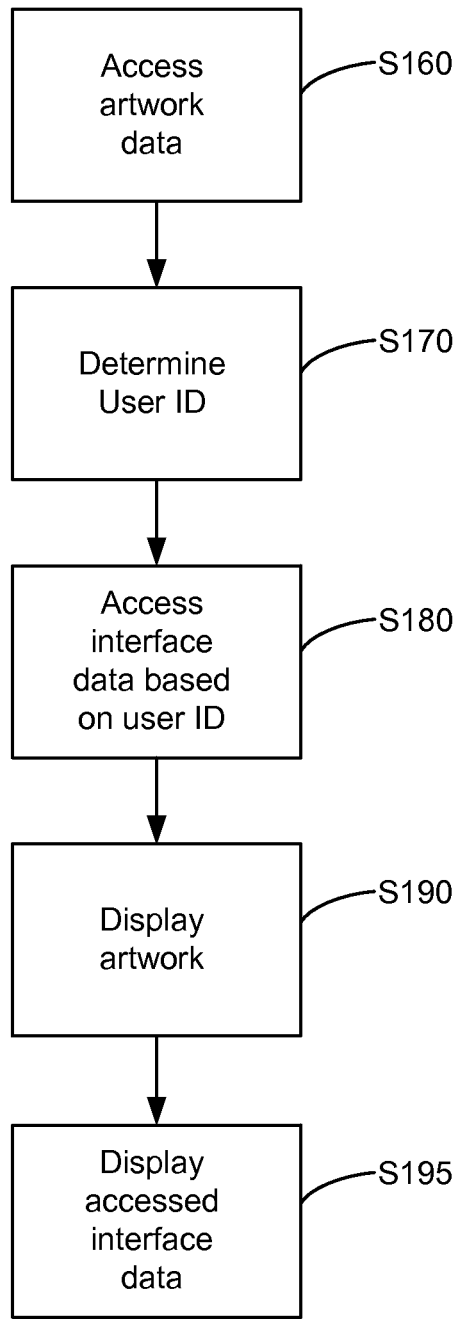
FIG. 5 is a flowchart diagram illustrating a method of accessing and using data according to some embodiments.

FIG. 5 is a flowchart diagram illustrating a method of accessing and using data according to some embodiments.

At step S 160, in response to an action from a user, such as a designer, data representing artwork, such as artwork 10 discussed above, is accessed by a computing device having a software application operating thereon.

At step S 170, a user ID is determined. For example, in response to the action of step S 160, or in response to another action, a request for a user ID may be presented to the user. In response to the request, the user enters a user ID of a user, whose interface element environment is desired. In response to the entered user ID, at step S 180, data indicating an interface element of the software application associated with the entered user ID, such as one of the interface elements discussed above with reference to FIG. 1, is accessed by the computing device.

At step S 190, in response to an action from the user, the artwork is displayed by the computing device. In some embodiments, the action, in response to which the artwork is displayed, is the same action in response to which the data representing the artwork is accessed in step S 160.

At step S 195, in response to an action from the user, the interface element is displayed. In some embodiments, the action, in response to which the interface element is displayed, is the same action in response to which data indicating the interface element of the software application is accessed. In some embodiments, multiple interface elements are displayed.

In some embodiments, the data representing the artwork and/or the data indicating the displayed interface element are located in a memory which is remote from the computing device. For example, the data representing artwork and/or the data indicating the displayed interface element may be located on a cloud computing network.

In some embodiments, the data representing the artwork and the data indicating the displayed interface element are each accessed, using a known address, such as a URL, with a software application configured to access the Internet.

Figure 6:
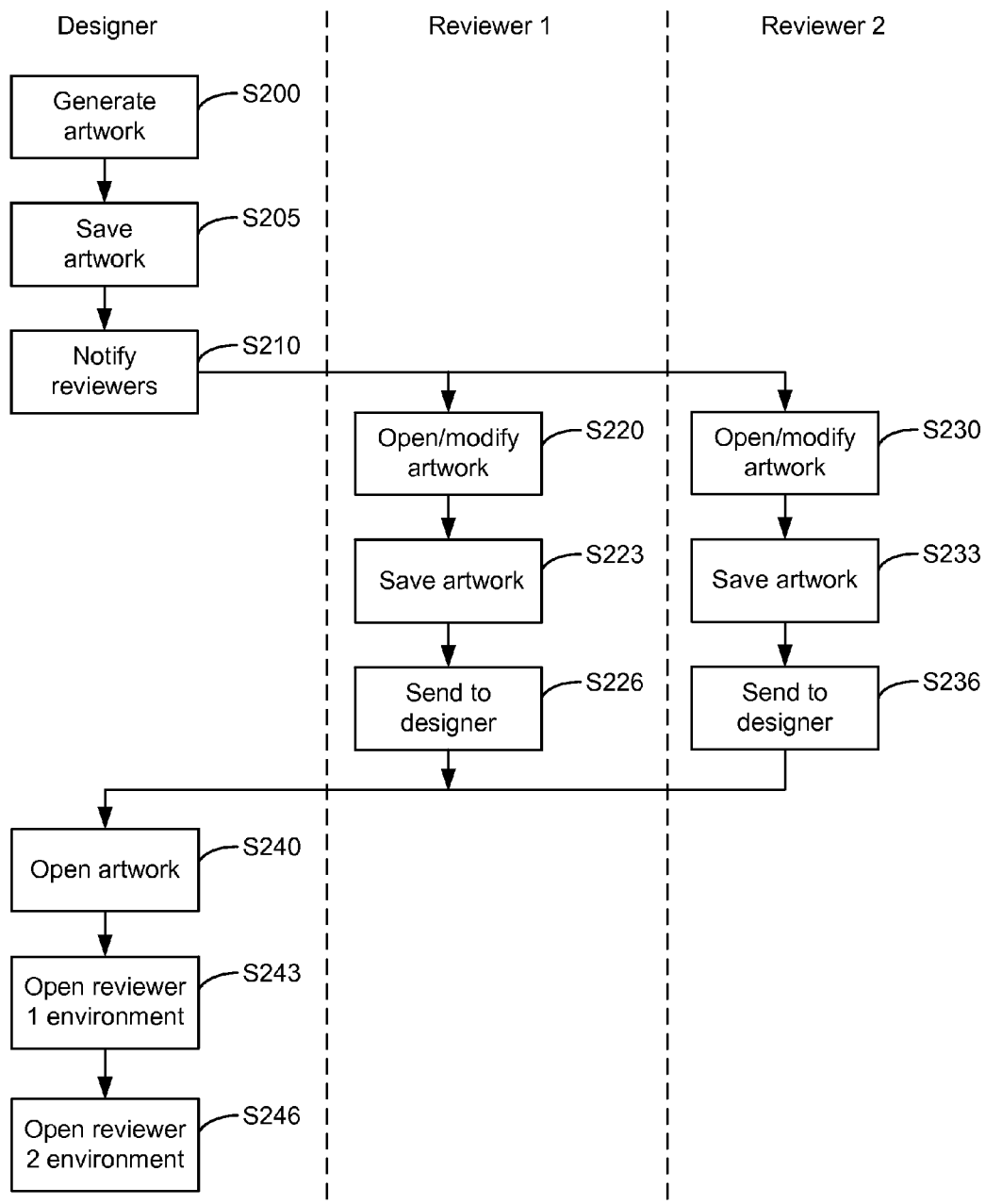
FIG. 6 is a flowchart diagram illustrating a method of saving, accessing, and using data in a collaborative design environment according to some embodiments.

FIG. 6 is a flowchart diagram illustrating a method of saving, accessing, and using data in a collaborative design environment according to some embodiments.

At step S 200, an artwork, such as artwork 10 discussed above, is generated by a designer using a computing device having a software application operating thereon.

At step S 205, in response to an action from the designer, data representing the artwork is saved to a memory of the computing device. In addition, in response to the same action or in response to another action from the designer, data indicating one or more interface elements is also saved to the memory. In this embodiment, the data indicating the displayed interface elements is stored with an identifier of the identity of the designer, such as a user ID.

At step S 210, a notification is given to first and second reviewers that the artwork is ready for review. The first and second reviewers may, for example, be a team member and a team lead for the project for which the artwork was generated.

At step S 220, in response to the notification, the first reviewer provides instructions to a computer to access and display the artwork. In addition, the first reviewer provides instructions to the computer to access and display the interface elements saved with the user ID of the designer. Once the artwork and the interface elements are displayed, the first reviewer reviews and optionally modifies the artwork and the interface elements.

At step S 223, in response to an action from the first reviewer, data representing the artwork is saved to a memory. In addition, in response to the same action or in response to another action from the first reviewer, data indicating one or more interface elements is also saved to the memory. In this embodiment, the data indicating the displayed interface elements is stored with an identifier of the identity of the first reviewer, such as a user ID.

At step S 226, notification is given to the designer that the artwork has been reviewed by the first reviewer.

At step S 230, in response to the notification that the artwork is ready for review, the second reviewer provides instructions to a computer to access and display the artwork. In addition, the second reviewer provides instructions to the computer to access and display the interface elements saved with the user ID of the designer. Once the artwork and the interface elements are displayed, the second reviewer reviews and optionally modifies the artwork and the interface elements.

At step S 233, in response to an action from the second reviewer, data representing the artwork is saved to a memory. In this example, the second reviewer does not modify the interface elements. Accordingly, data representing the interface elements is not saved with an identifier of the identity of the second reviewer.

At step S 236, notification is given to the designer that the artwork has been reviewed by the second reviewer.

At step S 240, in response to notification that the artwork has been reviewed, the designer provides instructions to a computer to access and display the artwork. Using the computer, the designer is able to review modifications made to the artwork by the first and second reviewers.

At step S 243, in response to the notification that the artwork has been reviewed by the first reviewer, the designer provides instructions to the computer to list sets of interface elements which have been saved. In response, the computer displays a list to the designer. In this example, the list includes a set of interface elements saved with the user ID of the first reviewer. The designer provides instructions to the computer to access and display the interface elements saved with the user ID of the first reviewer. Using the computer, the designer is able to review modifications made to the interface elements by the first reviewer.

At step S 246, in response to the notification that the artwork has been reviewed by the second reviewer, the designer provides instructions to the computer to list sets of interface elements which have been saved. In response, the computer displays a list to the designer. In this example, the list does not include a set of interface elements saved with the user ID of the second reviewer. As a result, the designer may conclude that the second reviewer did not modify the interface elements saved with the user ID of the designer.

Figure 7:
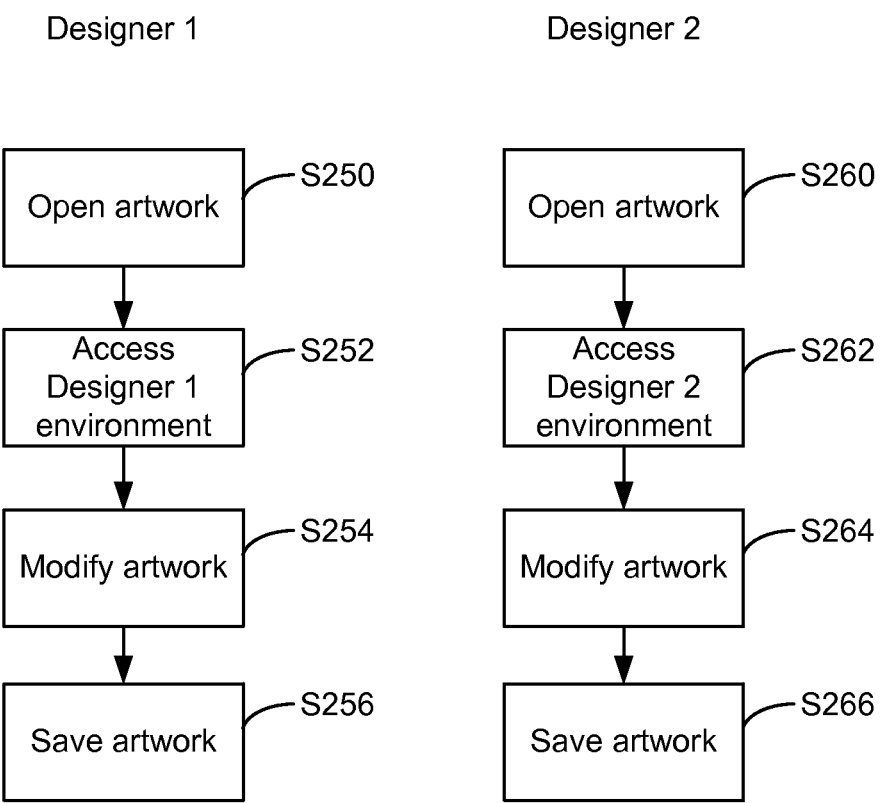
FIG. 7 is a flowchart diagram illustrating a method of saving, accessing, and using data in a collaborative design environment according to some embodiments.

FIG. 7 is a flowchart diagram illustrating a method of saving, accessing, and using data in a collaborative design environment according to some embodiments.

At step S 250, a first designer provides instructions to a computer to access and display an artwork. Using the computer, the first designer is able to view and edit the artwork.

At step S 252, the first designer provides instructions to the computer to access and display a first set of interface elements. For example, the first designer may provide instructions to the computer to list sets of interface elements which have been saved. In response, the computer displays a list to the first designer, from which the first designer selects the first set of interface elements. For example, the first designer may select a set of interface elements saved with the user ID of the first designer.

At step S 254, the first designer interacts with the first set of interface elements to modify the artwork.

At step S 256, in response to an action from the first designer, data representing the artwork is saved to a memory. In addition, in response to the same or another action from the first designer, data indicating the first set of interface elements is also saved to the memory.

At step S 260, a second designer provides instructions to a computer to access and display the artwork. Using the computer, the second designer is able to view and edit the artwork.

At step S 262, the second designer provides instructions to the computer to access and display a second set of interface elements. For example, the second designer may provide instructions to the computer to list sets of interface elements which have been saved. In response, the computer displays a list to the second designer, from which the second designer selects the second set of interface elements. For example, the second designer may select a set of interface elements saved with the user ID of the second designer.

At step S 264, the second designer interacts with the second set of interface elements to modify the artwork.

At step S 266, in response to an action from the second designer, data representing the artwork is saved to a memory. In addition, in response to the same or another action from the second designer, data indicating the second set of interface elements is also saved to the memory.

Figure 8:
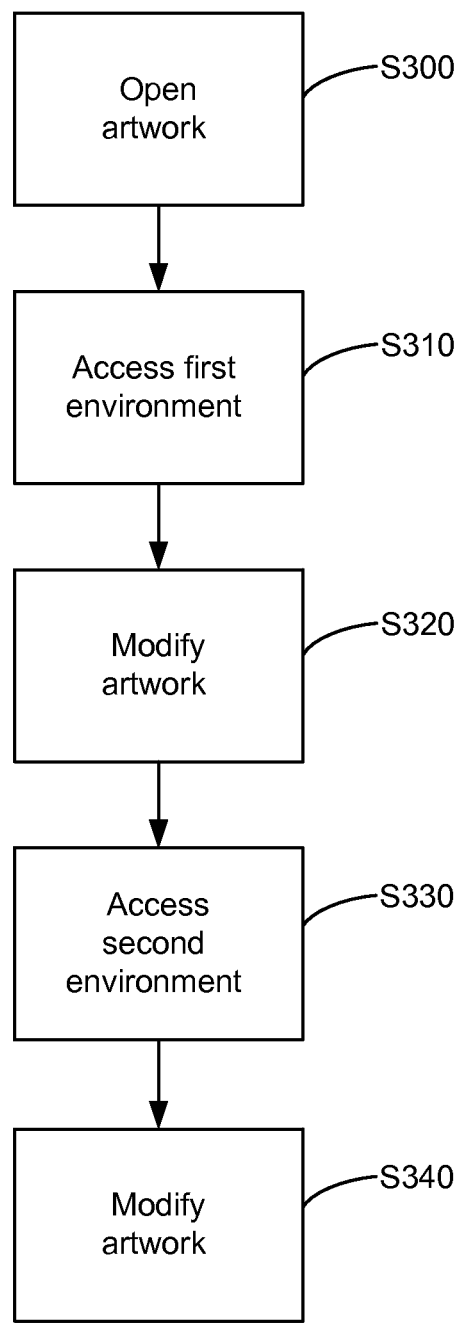
FIG. 8 is a flowchart diagram illustrating a method of accessing and using data according to some embodiments.

FIG. 8 is a flowchart diagram illustrating a method of accessing and using data according to some embodiments.

At step S 300, a designer provides instructions to a computer to access and display an artwork. Using the computer, the designer is able to view and edit the artwork.

At step S 310, the designer provides instructions to the computer to access and display a first set of interface elements. For example, the designer may provide instructions to the computer to list sets of interface elements which have been saved. In response, the computer displays a list to the designer, from which the designer selects the first set of interface elements. For example, the designer may select a set of interface elements saved with a name, for example, indicative to the designer of the interface elements contained therein. For example, the first set of interface elements may be saved with a name indicative to the designer that the first set of interface elements may be used for modifying text.

At step S 320, the designer interacts with the first set of interface elements to modify text of the artwork.

At step S 330, the designer provides instructions to the computer to access and display a second set of interface elements. For example, the designer may provide instructions to the computer to list sets of interface elements which have been saved. In response, the computer displays a list to the designer, from which the designer selects the second set of interface elements. For example, the designer may select a set of interface elements saved with a name, for example, indicative to the designer of the interface elements contained therein. For example, the second set of interface elements may be saved with a name indicative to the designer that the second set of interface elements may be used for modifying graphics.

At step S 340, the designer interacts with the first set of interface elements to modify graphics of the artwork.

Figure 9:
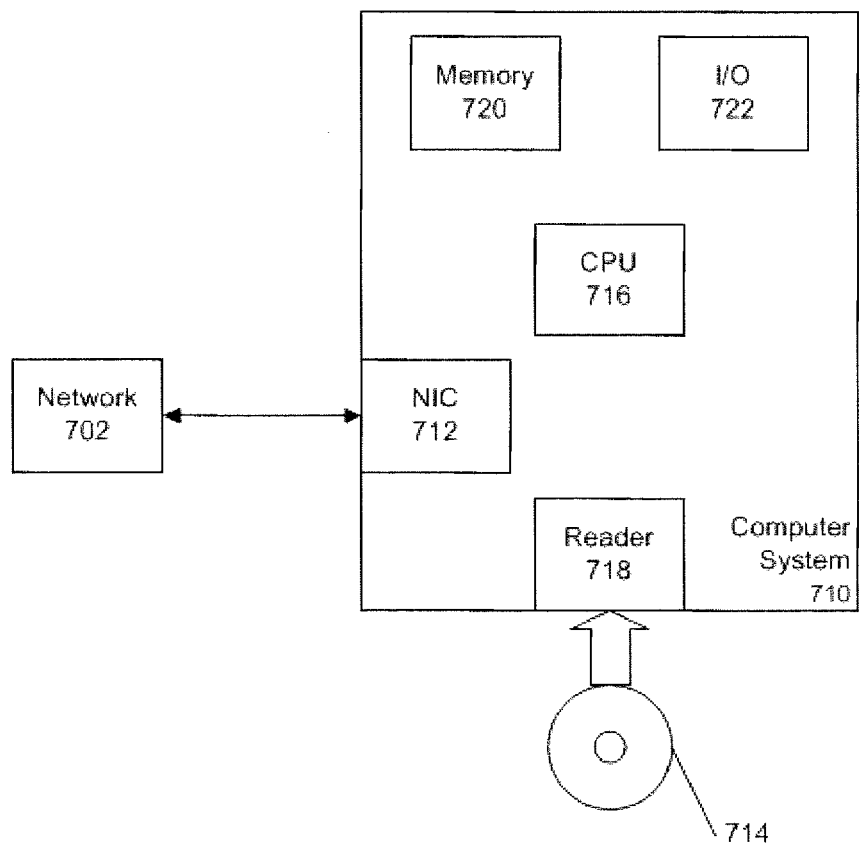
FIG. 9 shows a configuration for a computer system constructed in accordance with the present disclosure.

FIG. 9 shows a configuration for a computer system 710, which may be used as any of the computing devices discussed above. The computer system 710 can comprise a system such as a personal computer or server computer or the like. The computer system 710 may include a network communication interface 712 that permits communications with a network 702. The network interface can comprise a network interface card (NIC). The computer system 710 can execute instructions to provide a computer system which performs various aspects and principles of the methods and features described herein.

The computer system 710 includes a processor, such as a central processor unit 716 (CPU) and a program product reader 718 for receiving a program product media and reading program instructions recorded thereon, where the instructions, when executed by the computer, cause the computer to perform various aspects and principles of the methods and features described herein. The computer system also includes associated memory 720 and input/output facilities 722, such as a display for output and a keyboard and/or mouse for input. The processor 716 of the computer system 710 can receive program instructions into the program memory of the processor. The program instructions can be received directly, such as by flashing EEPROM of the processor, or can be received through the network interface 712, such as by download from a connected device or over a WAN or LAN network communication. If desired, the program instructions can be stored on a computer program product 714 that is read by the computer system 710 so that the program instructions can thereafter be executed. That is, the program product 714 is for use in a system such as the computer system 710, wherein the program product comprises a tangible, non-transitory recordable media containing a program of computer-readable instructions that are executable by the device processor 704 to perform the operations described herein. The program product 714 can comprise, for example, optical program media such as CD or DVD data discs, or flash memory drives, or external memory stores, or floppy magnetic disks, and the like.

Figure 10:
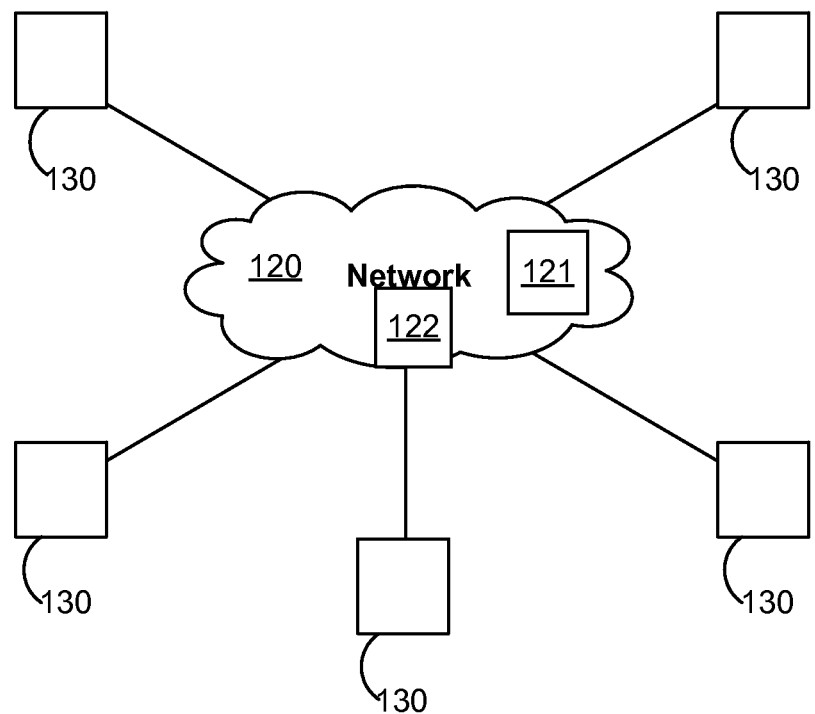
FIG. 10 is a block diagram illustrating an implementation of a cloud computing network.

FIG. 10 is a block diagram illustrating an implementation of a cloud computing network. As discussed above the systems and methods described herein may be performed using a cloud computing network. As shown, the network 200 includes communications network 120 and a plurality of devices 130. In this implementation, the communications network 120 includes cloud controller 121 configured to manage access among devices of the cloud computing network.

The communications network 120 may include, for example, computing resources such as servers, routers, computational resources, memory, databases, software, services such as printing, and the like. In some implementations, the network resources 120 are understood to be always available for use by the devices 130 at least to allow the devices 130 to communicate with one another and with the resources of the network 120.

The devices 130 may include such devices as desktop computers, phones, laptop computers, and servers, which may be configured to perform the methods described herein. The devices 130 may be selectively connectable to the communications network resources 120. For example, a user may turn on a laptop computer, connect to the cloud, access a file from another device 130, and then disconnect from the cloud.

Applications and other electronic content execute or are otherwise used on the exemplary computer devices, and are shown as functional components or modules. As is known to one of skill in the art, such applications and content may be resident in any suitable computer-readable medium and execute on any suitable processor.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, and JavaScript. The instructions may be executed or otherwise used to provide one or more of the features described herein.

The client device may also comprise a number of external or internal devices such as a mouse, a CD-ROM, DVD, a keyboard, a display, audio speakers, one or more microphones, or any other input or output devices. For example, device is shown with a display having a user interface and various user interface devices. A bus is included in the device. The computing devices described herein could each be a personal computing device, a mobile device, a server computer device, or any other type of electronic devices appropriate for providing one or more of the features described herein.

The network(s) may include any one or a combination of many different types of networks, such as cable networks, the Internet, wireless networks, cellular networks and other private and/or public networks.

The exemplary devices provide an example configuration in which the exemplary search engine reduction ratio service can be provided. Other configurations may be used with modifications, additions, and deletions to address the particular circumstances in which a particular system is used.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally.

What is claimed is:

1. A method, comprising:
    displaying, using an artwork editing application operating on a computing device, a representation of an artwork file;
    receiving, using the computing device, input selecting an interface element for use in an interface of the artwork editing application;
    displaying, using the computing device, the selected interface element of the artwork editing application on the interface, wherein access to one or more editing features or editing functions is available through user interaction with the selected interface element on the interface of the artwork editing application; and
    saving data to a memory on a cloud computing device, wherein the data comprises a representation of the artwork file and an indication of the selected interface element of the artwork editing application, wherein the data further comprises indications of additional interface elements selected by a plurality of users for use with respect to the artwork file, wherein the interface is configured to use the indications to determine which of the interface elements to display based on an artwork file identity and a user identity.

2. The method of claim 1, wherein the data further comprises indications of additional interface elements selected by a plurality of users, the data associating each of the additional interface elements with a respective user of the plurality of users that selected the respective additional interface element.

3. The method of claim 1, wherein the data further comprises an indication of a display location of the selected interface element on the interface.

4. The method of claim 1 further comprising receiving a selection of a location to display the selected interface element on the interface, wherein the data further comprises an indication of a display location of the selected interface element on the interface.

5. The method of claim 1, wherein displaying the interface element comprises displaying a menu comprising a plurality of selectable graphics that may be individually added to the artwork file.

6. The method of claim 1, wherein displaying the interface element comprises displaying a menu comprising a plurality of selectable graphics including at least one of a glyph and a symbol.

7. The method of claim 1, wherein displaying the interface element comprises displaying a menu comprising a plurality of selectable action control elements, wherein each action control element defines a quality of a modification to the artwork file in response to an input.

8. The method of claim 1, wherein displaying the interface element comprises displaying a menu comprising a plurality of selectable action control elements, wherein the action control elements comprise at least one of a swatch, a brush, a font, and a color setting.

9. The method of claim 1, further comprising opening the artwork file from another computer, wherein opening the artwork file comprises:
    accessing the representation of the artwork file;
    accessing the representation of the selected interface element;
    displaying a representation of the accessed artwork file; and
    displaying a representation of the accessed selected interface element.

10. A computer system, comprising:
    a processor;
    a display; and
    a memory, comprising instructions, which, when executed by the processor, cause the computer system to perform a method, the method comprising:
    displaying a representation of an artwork file using an artwork editing application on the display;
    displaying a selected interface element for use in an interface of the artwork editing application on the display; and
    saving data to the memory on a cloud computing device, wherein the data comprises a representation of the artwork file and an indication of the selected interface element of the application, wherein the data further comprises indications of additional interface elements selected by a plurality of users for use with respect to the artwork file, wherein the interface is configured to use the indications to determine which of the interface elements to display based on an artwork file identity and a user identity.

11. The computer system of claim 10, wherein displaying the interface element comprises displaying a plurality of selectable graphics which may be added to the artwork file.

12. The computer system of claim 10, wherein displaying the interface element comprises displaying a plurality of selectable action control elements, wherein each action control element defines a quality of a modification to the artwork file in response to an input.

13. The computer system of claim 10, wherein the method further comprises opening the artwork file from another computer, wherein opening the artwork file comprises:
    accessing the representation of the artwork file;
    accessing the representation of the selected interface element;
    displaying a representation of the accessed artwork file; and
    displaying a representation of the accessed selected interface element.

14. A non-transitory computer-readable device comprising instructions, which, when executed, cause a computer to perform a method, the method comprising:
    displaying a representation of an artwork file of an application on a display;
    displaying a selected interface element for use in an interface of the application on the display; and
    saving data to a memory on a cloud computing device, wherein the data comprises a representation of the artwork file and an indication of the selected interface element of the application, wherein the data further comprises indications of additional interface elements selected by a plurality of users for use with respect to the artwork file, wherein the interface is configured to use the indications to determine which of the interface elements to display based on an artwork file identity and a user identity.

15. The computer-readable device of claim 14, wherein displaying the interface element comprises displaying a plurality of selectable graphics which may be added to the artwork file.

16. The computer-readable device of claim 14, wherein displaying the interface element comprises displaying a plurality of selectable action control elements, wherein each action control element defines a quality of a modification to the artwork file in response to an input.

17. The computer-readable device of claim 14, wherein the data further comprises an identification of a user of a computing device.

18. The computer-readable device of claim 14, wherein the method further comprises opening the artwork file from another computer, wherein opening the artwork file comprises:
- accessing the representation of the artwork file;
- accessing the representation of the selected interface element;
- displaying a representation of the accessed artwork file; and
- displaying a representation of the accessed selected interface element.

* * * * *